(12) United States Patent
Zhang

(10) Patent No.: US 8,131,257 B2
(45) Date of Patent: Mar. 6, 2012

(54) METHOD FOR SELECTING AND SWITCHING ACCOUNTING MODE, AND DEVICE THEREOF

(75) Inventor: Jin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 912 days.

(21) Appl. No.: 12/110,794

(22) Filed: Apr. 28, 2008

(65) Prior Publication Data

US 2009/0005006 A1    Jan. 1, 2009

Related U.S. Application Data

(63) Continuation of application No. PCT/CN2006/002931, filed on Nov. 1, 2006.

(30) Foreign Application Priority Data

Nov. 3, 2005 (CN) .......................... 2005 1 0119513

(51) Int. Cl.
*H04M 11/00* (2006.01)

(52) U.S. Cl. .............. 455/406; 379/114.01; 379/114.02; 379/114.03

(58) Field of Classification Search .................. 455/406; 379/114.01–114.03
See application file for complete search history.

(56) References Cited

U.S. PATENT DOCUMENTS

| | | | |
|---|---|---|---|
| 6,226,364 B1 | 5/2001 | O'Neil | |
| 6,785,534 B2 | 8/2004 | Ung | |
| 7,215,942 B1 * | 5/2007 | McQuaide et al. | 455/408 |
| 2002/0035479 A1 | 3/2002 | Takae et al. | |
| 2003/0069840 A1 * | 4/2003 | Ung | 705/39 |
| 2003/0130946 A1 | 7/2003 | Gabrysch et al. | |
| 2004/0106393 A1 * | 6/2004 | Chowdhury et al. | 455/406 |
| 2004/0259527 A1 | 12/2004 | Lindberg | |

FOREIGN PATENT DOCUMENTS

| | | |
|---|---|---|
| CN | 1447579 A | 10/2003 |
| CN | 1579087 | 2/2005 |
| EP | 1191776 A2 | 3/2002 |
| EP | 1322063 A2 | 6/2003 |
| WO | 99/30480 A | 6/1999 |
| WO | 02/08863 A2 | 1/2002 |

OTHER PUBLICATIONS

Korean Office Action for Korean Patent Application No. 10-2008-7012150, dated Feb. 12, 2010, and English translation thereof.
English translation of the Written Opinion of the International Searching Authority for International Patent Application No. PCT/CN2006/002931, dated Feb. 8, 2007.
Chinese Office Action for Chinese Patent Application No. 200810188025.3, dated Feb. 5, 2010, and English translation thereof.
Chinese Office Action for Chinese Patent Application No. 200510119513.5, dated Feb. 20, 2009, and English translation thereof.
Chinese Office Action for Chinese Patent Application No. 200510119513.5, dated Jan. 8, 2010, and English translation thereof.
Supplementary European Search Report for European Application No. 06805132.5, dated Aug. 8, 2008.
International Search Report for International Application No. PCT/CN2006/002931, dated Feb. 8, 2007, with English translation.

* cited by examiner

*Primary Examiner* — Charles Appiah
*Assistant Examiner* — Jaime Holliday

(57) ABSTRACT

A method for selecting an accounting mode, a method for switching an accounting mode, and a device therefor. The method for switching an accounting mode includes: notifying a prepaid accounting server to establish a session; assigning an accounting quota of the session to the prepaid client; notifying the prepaid accounting server that the accounting quota of the session is depleted, and notifying the prepaid client to stop the prepaid accounting; keeping the session established and notifying an AAA server to start a postpaid accounting.

6 Claims, 4 Drawing Sheets

METHOD FOR SELECTING AND SWITCHING ACCOUNTING MODE, AND DEVICE THEREOF

CROSS-REFERENCE TO RELATED APPLICATIONS

This application is a continuation application of International Application No. PCT/CN2006/002931, filed on Nov. 1, 2006. This application claims the benefit of Chinese Application No. 200510119513.5 filed, on Nov. 3, 2005. The disclosures of the above applications are incorporated herein by reference.

FIELD

The present disclosure relates to communication technologies, and to selecting and switching an accounting mode in Worldwide Interoperability Microwave Access (WiMAX).

BACKGROUND

The statements in this section merely provide background information related to the present disclosure and may not constitute prior art.

With the fast development of Internet services and the wide application of wireless networks, WiMAX, General Packet Radio Service (GPRS) and wireless access networks such as 3G and B3G gain much application and attention, and wireless access networks are required to be able to provide various services of large capacity, large data traffic and different QoS requirements. At present, in wireless access networks, how to get the accounting information such as data volumes/service time which is provided to a subscriber is very important for a communication system.

In the prior art, the accounting mode of WiMAX includes prepaid accounting mode and postpaid accounting mode.

Prepaid means that a subscriber prepays the carrier for using the communication service in a certain period. The advantage of the prepaid accounting mode is that the carrier does not take a risk of nonpayment, so the service accounting rate is low. The prepaid accounting mode is suitable for a subscriber group which is sensitive to communication charge and has a low credibility. The disadvantage of the prepaid accounting mode is in that, during using the communication service, once the deposit is depleted, the carrier suspends the communication service used by the subscriber and deactivates the communication service for the subscriber until the subscriber redeposits a certain charge in his account. However, the carrier may suspend the subscriber for when the account is depleted and the subscriber cannot redeposit in time in some special scenarios. As a result, economic loss may be caused to the subscriber because the communication service cannot be used, and the satisfaction with the carrier may be lowered.

Postpaid accounting mode means that a subscriber is allowed to use communication services first, and the carrier periodically settles the communication charge with the subscriber. The advantage of the postpaid accounting mode lies in that, it is convenient for the subscriber and the subscriber does not need to pay attention to the account balance and worry about suspending the client for nonpayment or a depleted account. The postpaid accounting mode is suitable for a subscriber group which has a low sensitivity to communication charge and a high credibility. The disadvantage of the postpaid accounting mode lies in that the carrier takes a high risk of nonpayment. Therefore, the charge rate is usually higher than that of the prepaid service.

At present, many subscribers want to enjoy the advantage of the low charge rate of prepaid service, but they do not want to be suspended for a depleted account in special situations and thus unable to use the communication service. However, in the existing system, the accounting system for prepaid accounting and the accounting system for postpaid accounting are independent, and the two accounting modes in the system usually put forward communication services which are directed to corresponding subscriber groups. Usually, a subscriber can only enjoy the service characteristic of one accounting mode. If the subscriber wants to enjoy the special service of the other accounting mode, the subscriber needs to register a modification with the carrier so as to switch the accounting mode. Therefore, a great inconvenience will be caused to the subscriber. If the subscriber needs to use different special services, the subscriber has to switch between the prepaid service and the postpaid service frequently, so that the manpower cost of the carrier is increased and subscriber satisfaction will be lowered.

SUMMARY

According to various embodiments, a method and a device for selecting and switching an accounting mode to allow a subscriber to discretionarily select or switch an accounting mode according to the communication service or demand.

A method for selecting an accounting mode, including:

registering, by a subscriber, a type of accounting mode on a mobile subscriber station;

selecting the accounting mode before a session is established; and establishing the session according to the accounting mode selected.

Further, a method for switching an accounting mode, including:

selecting a prepaid accounting mode before a service is started;

authenticating the prepaid accounting mode and determining to employ the prepaid accounting mode according to an authentication result; accounting after a session is established according to the prepaid accounting mode; and switching, by an access service network gateway, the prepaid accounting mode to a postpaid accounting mode according to an authentication data of a subscriber after an accounting quota of the session is depleted, and notifying an AAA server to perform a postpaid accounting.

Further, a method for switching an accounting mode, including:

notifying, by a prepaid client, a prepaid accounting server to establish a session, and assigning, by the prepaid accounting server, an accounting quota of the session to the prepaid client;

notifying, by the prepaid client, the prepaid accounting server that the accounting quota of the session is depleted, and notifying, by the prepaid accounting server, the prepaid client to stop a prepaid accounting; and keeping the session established and notifying, by the prepaid client, an authentication, authorization and accounting server to start a postpaid accounting.

Further yet, a device for switching an accounting mode, including:

a selecting unit, adapted to select an accounting mode before a session is established;

an authenticating unit, adapted to authenticate the accounting mode selected and determine to employ the accounting mode according to an authentication result;

a session-establishing unit, connected with the selecting unit, adapted to establish the session according to the accounting mode selected and start accounting; and a switching unit, connected with the session-establishing unit, adapted to switch an accounting mode after the accounting quota of the session is depleted, and notify an AAA server to start a postpaid accounting.

Further yet, a device for selecting an accounting mode, including:

a registering unit, adapted to store a type of accounting mode registered by a subscriber on a mobile subscriber station;

a selecting unit, connected with the registering unit, adapted to select an accounting mode before a session is established; and an accounting unit, connected with the selecting unit, adapted to establish a corresponding session according to the accounting mode selected.

The prepaid accounting mode is switched to the postpaid accounting mode without interrupting the communication service in WiMAX wireless access network. A subscriber may enjoy a low charge and avoids suffering a loss due to the interruption of the communication service when the accounting balance of the subscriber is depleted. Additionally, a subscriber may select an accounting mode before starting a service, without re-registering with the carrier. As a result, it is not only convenient for the subscriber to enjoy more types of communication services, but also favourable for the carrier to save manpower cost, and the subscriber satisfaction may be improved.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

To facilitate understanding the disclosure, the architecture of WiMAX accounting network is first introduced.

Figure 1:
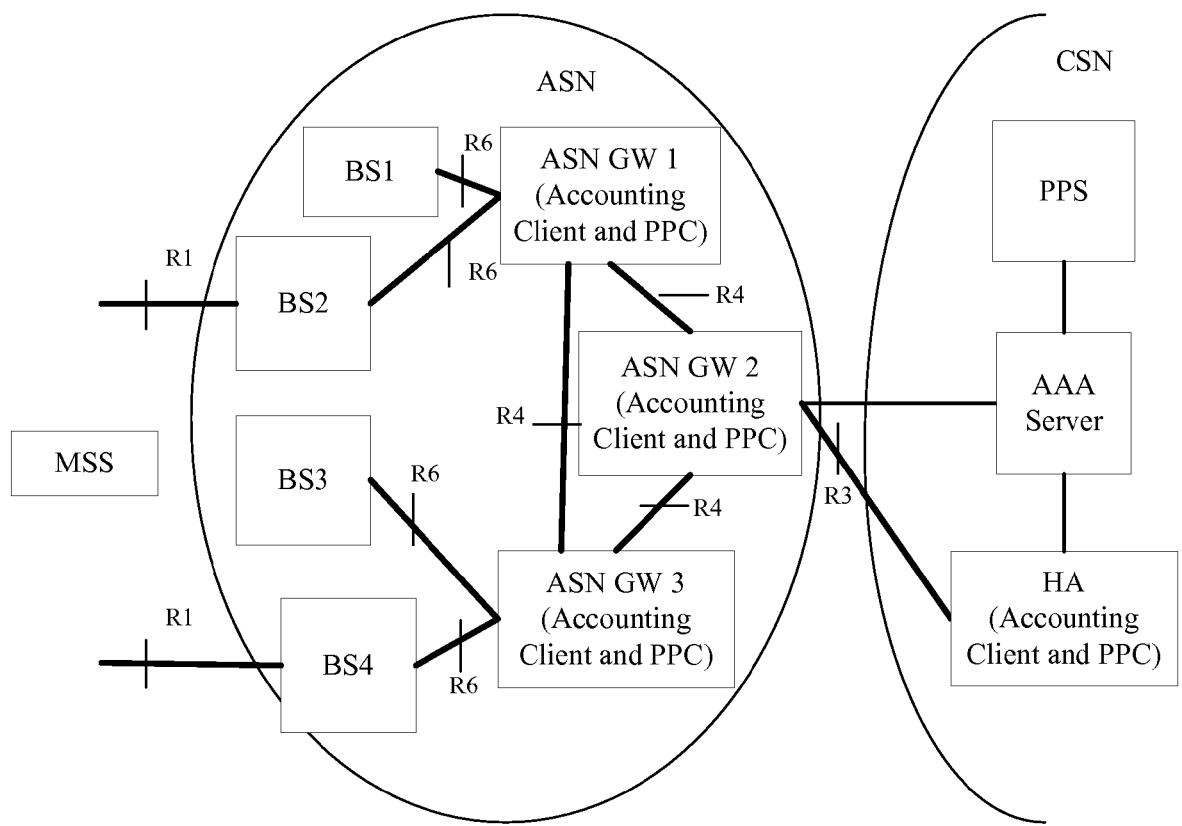
FIG. 1 is an architecture of the WiMAX accounting network according to various embodiments.

FIG. 1 is a schematic diagram showing the architecture of WiMAX accounting network, including: a mobile subscriber station (MSS), an access service network (ASN) and a connectivity service network (CSN). The MSS is a mobile subscriber equipment, and a subscriber uses the MSS to access a WiMAX network, as shown in FIG. 1.

The ASN is defined as a network function collection for providing a wireless access service to a WiMAX terminal, and includes: a Base Station (BS), such as BS1, BS2 and BS3 shown in FIG. 1; and Access Service Network Gateway (ASN GW), such as ASN GW1, ASN GW2 and ASN GW3 shown in FIG. 1. The ASN GW provides client functions for MSS authentication, authorization and accounting. An accounting client is configured on the ASN GW for collecting the accounting data and information of the ASN and reporting the accounting information to the AAA server. In addition, the accounting client may not be located on the ASN GW and be an independent network element. The accounting client corresponding to the MSS is located in an ASN GW, and the accounting functional entities corresponding to other MSS are located in other ASN GWs.

The CSN provides an IP connection service to a WiMAX terminal. The main function of CSN includes: IP address allocation of MSS, AAA proxy or server authentication, establishment of ASN-to-CSN tunnel and provision of home agency (HA) in mobile IP technology, accounting of a WiMAX subscriber and settling between carriers (which is mainly accomplished by an accounting server/accounting proxy), and subscriber-based authorization control.

In the architecture of WiMAX accounting network as shown in FIG. 1, ASN GW1 acts as an access service gateway when MSS initially establishes a session. ASN GW2 acts as an access service gateway after the MSS is switched. The MSS accesses the Internet via the BS, ASN GW and HA, and uses the data service.

Figure 2:
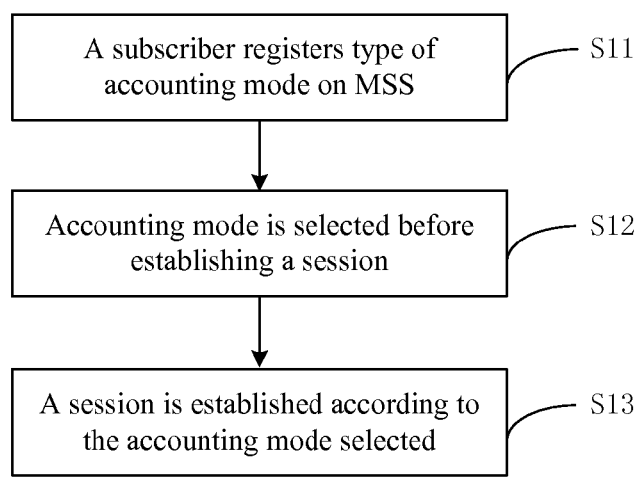
FIG. 2 is a flow chart of a method for selecting an accounting mode.

FIG. 2 is a flow chart of the method for selecting an accounting mode, and the method includes the following processes:

Block S11: A subscriber registers a type of accounting mode on an MSS.

Block S12: An accounting mode is selected before a session is established.

Block S13: A corresponding session connection is established according to the accounting mode selected.

Figure 3:
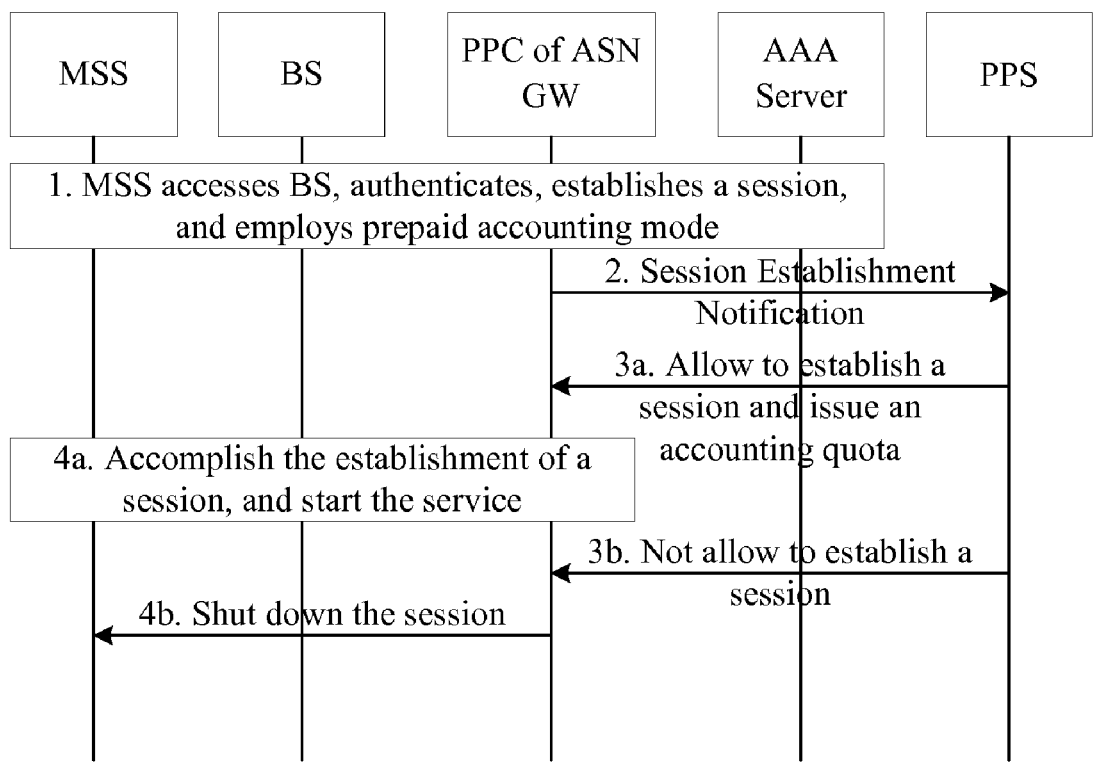
FIG. 3 is a flow chart of a method for the prepaid accounting.

If the subscriber selects a prepaid accounting mode before the session is established, the detailed implementation is shown in FIG. 3. As shown in FIG. 3, when a subscriber registers subscriber subscription information with the carrier, the prepaid and the postpaid accounting mode may be selected at the same time. In other words, before the subscriber uses the MSS to establish a session and carry out data service, the subscriber may discretionarily select the prepaid accounting mode and/or the postpaid accounting mode as required. If the subscriber selects the prepaid accounting mode, the MSS may first access the BS via R1 interface, and the BS initiates an authentication process to an AAA Server via the ASN GW. After the AAA server authenticates and authorizes the MSS, the ASN GW determines that the subscriber employs the prepaid accounting mode according to the authentication data of the AAA server. A prepaid client (PPC) of the ASN GW notifies a prepaid accounting server (PPS) to establish a data session, and the PPS determines whether it is allowed to establish a session according to the charge status of the subscriber configured, i.e., the balance in the subscriber account. If a balance exists in the subscriber account, the PPS makes a response that a session is allowed to be established, and assigns an accounting quota. The accounting quota includes: the duration of session, data volumes or a combination thereof. If no balance exists in the subscriber account, the PPS notifies the PPC that the session is not allowed to be established, and the ASN GW notifies the MSS to terminate the session.

Figure 4:
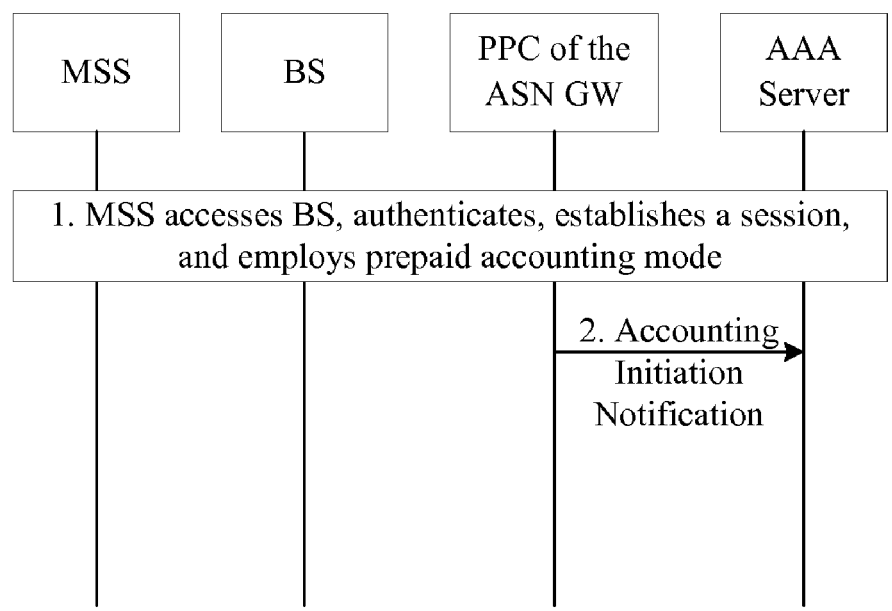
FIG. 4 is a flow chart of a method for the postpaid accounting.

Similarly, in the case that the subscriber selects a postpaid accounting mode before the session is established, the detailed implementation is shown in FIG. 4. As shown in FIG. 4, if the subscriber selects the postpaid accounting mode on the MSS, after the subscriber accomplishes the authentication process, the ASN GW determines that the subscriber employs the postpaid accounting mode according to the authentication data. After the session is established, an accounting client of the ASN GW notifies the postpaid accounting module on the AAA server to start accounting, and the AAA server is responsible for generating a bill of the subscriber. If the subscriber does not switch the accounting mode to the prepaid accounting mode before starting the next session service, the accounting mode of the subscriber is kept as the postpaid accounting mode.

Through the above method for selecting an accounting mode, a subscriber may select the type of accounting mode before starting a communication service and switch the accounting mode flexibly in WiMAX according to the specific requirement of the communication service and the requirement of the subscriber.

Figure 5:
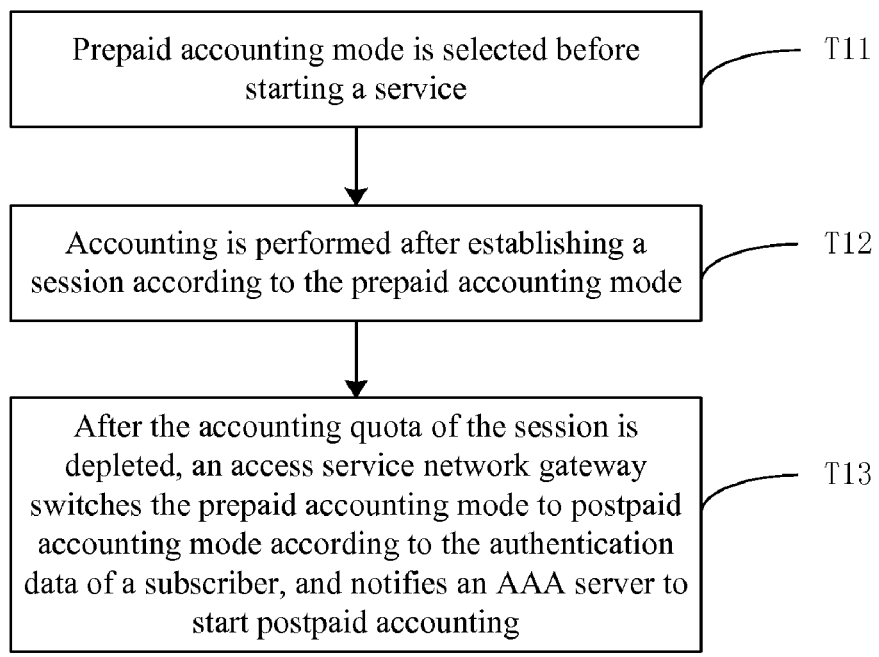
FIG. 5 is a flow chart of a method for switching an accounting mode.

FIG. 5 depicts a flow chart of the method for switching the accounting mode from the prepaid accounting mode to the postpaid accounting mode, and the method includes the following processes.

Block T11: The prepaid accounting mode is selected before a service is started.

Block T12: The accounting is performed after a session connection is established according to the prepaid accounting mode.

Block T13: After the accounting quota of the session is depleted, an access service network gateway switches from the prepaid accounting mode to the postpaid accounting mode according to the authentication data of the subscriber, and notifies an AAA server to start the postpaid accounting.

Figure 6:
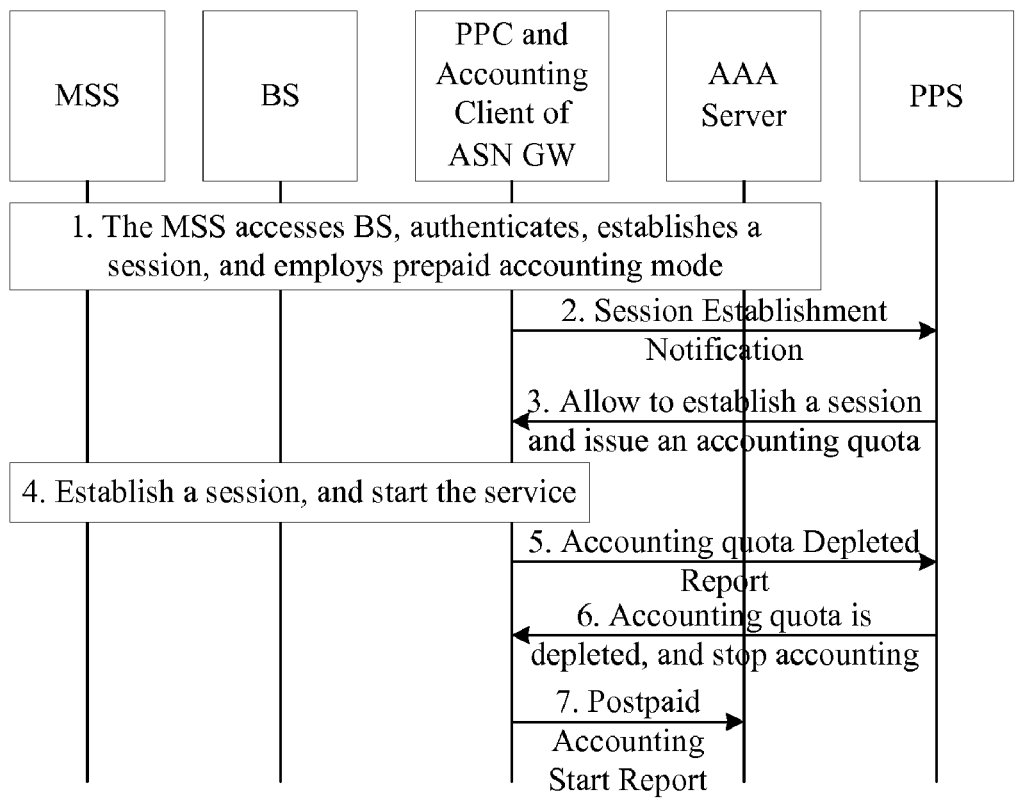
FIG. 6 is a flow chart of a method for a prepaid accounting mode switching to a postpaid accounting mode.

One example of the method of FIG. 5 is shown in FIG. 6. When a subscriber registers subscriber subscription information with the carrier, the subscriber may select the prepaid accounting mode and the postpaid accounting mode, and after the accounting quota is depleted, the accounting mode is automatically switched to the postpaid accounting mode and a certain charge is deposited in the account. Before the subscriber uses the communication service, the subscriber selects the prepaid accounting mode on the MSS. The MSS accesses the BS and initiates an authentication process to the AAA server in the CSN via an ASN GW. The AAA server in the CSN authenticates the information such as the service type, QoS and accounting mode of the subscriber, and the ASN GW determines that the subscriber selects the prepaid accounting mode according to the authentication data of the AAA server in the CSN. A prepaid client of the ASN GW notifies the prepaid accounting server to establish a data session, and the PPS determines whether to establish the session according to the charge status of the subscriber. If a balance exists in the subscriber account, the PPS makes a response that it is allowed to establish the session and the PPS assigns an accounting quota. The accounting quota includes: a session time length, data traffic or a combination thereof. After the accounting quota of the session is depleted, a prepaid client of the ASN GW notifies the prepaid accounting server that the accounting quota is depleted. If the PPS determines that the quota of the subscriber has been depleted, the PPS notifies the PPC of the ASN GW to stop the prepaid accounting. At this point, the communication session of the subscriber is maintained. The ASN GW determines whether the subscriber is allowed to switch to the postpaid accounting mode according to the authentication data of the user. If the subscriber is allowed to switch to the postpaid accounting mode, the accounting client of the ASN GW notifies the postpaid accounting unit of the AAA server to start accounting. The AAA server is responsible for generating a postpaid accounting bill of the subscriber. After a period of time, the carrier settles the charge with the subscriber. When the subscriber wants to switch to the prepaid accounting mode, the subscriber needs to deposit a certain charge in the subscriber account and prepaid accounting mode is selected.

Figure 7:
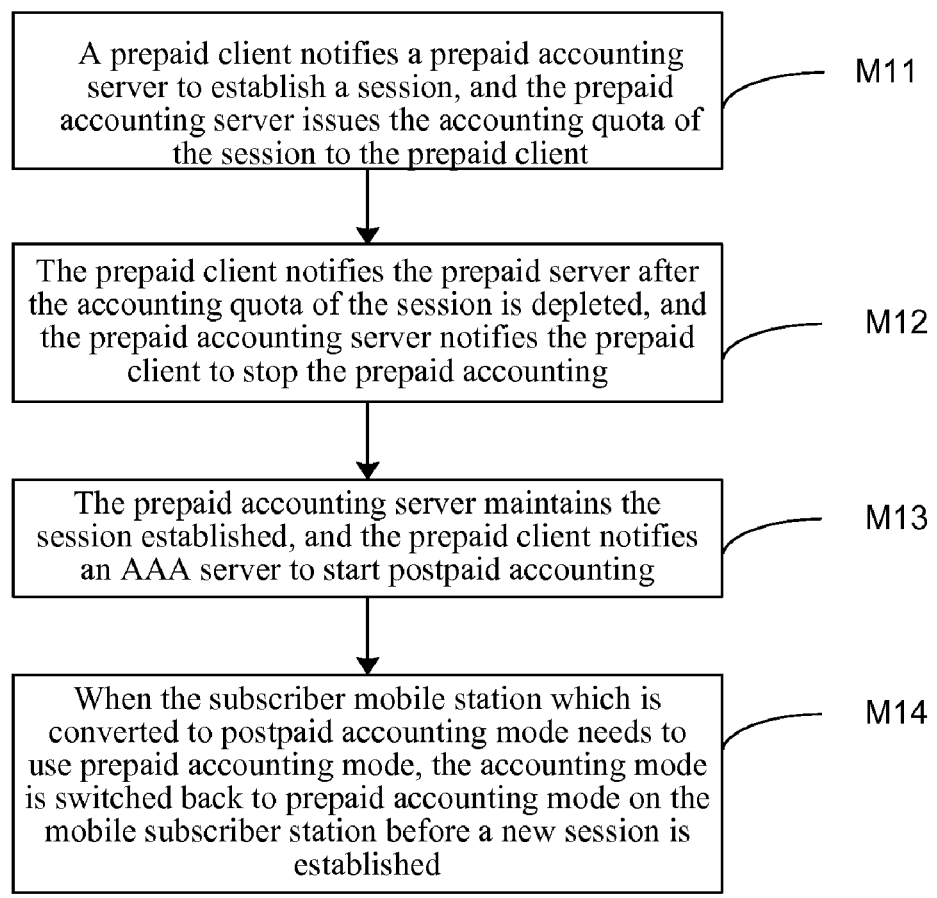
FIG. 7 is another flow chart of the method for switching an accounting mode.

Various embodiments may include a method for switching an accounting mode. FIG. 7 shows the flow chart of the method, and the method includes the following processes.

M11: A prepaid client notifies a prepaid accounting server to establish a session, and the prepaid accounting server assigns the accounting quota of the session to the prepaid client.

M12: The prepaid client notifies the prepaid accounting server after the accounting quota of the session is depleted, and the prepaid accounting server notifies the prepaid client to stop the prepaid accounting.

M13: The session established is maintained, and the prepaid client notifies an AAA server to start the postpaid accounting.

M14: When the MSS which is switched to the postpaid accounting mode needs to use the prepaid accounting mode, a certain charge is deposited in the account corresponding to the MSS and the accounting mode is switched back to the prepaid accounting mode on the MSS before a new session is established. The system of FIG. 7 operates similarly to like units described above.

Figure 8:
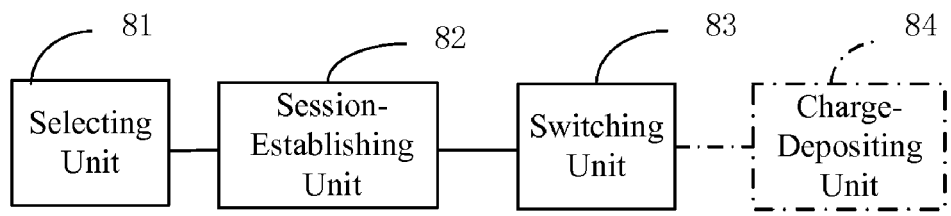
FIG. 8 is a structural representation of a device for switching an accounting mode.

A device for switching an accounting mode, and the structure of the device is shown in FIG. 8. The device includes: selecting unit 81, session-establishing unit 82, switching unit 83 and/or charge-depositing unit 84 (as shown by the dashed line in the figure). Selecting unit 81 is adapted to select an accounting mode before a session is established. Session-establishing unit 82 communicates with selecting unit 81 and is adapted to establish a session connection according to the accounting mode selected and start accounting. Switching unit 83 communicates with session-establishing unit 82 and is adapted to switch the accounting mode after the accounting quota of the session is depleted and notify an AAA server to start the postpaid accounting. Charge-depositing unit 84 communicates with switching unit 83 and is adapted to deposit a certain charge in an account corresponding to the MSS.

Figure 9:
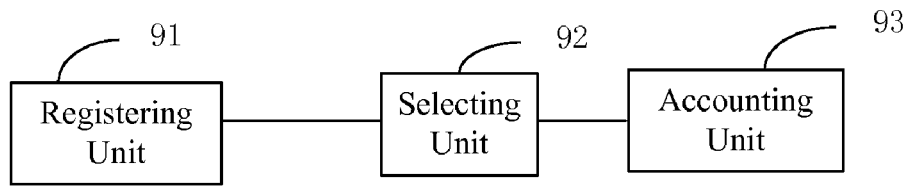
FIG. 9 is a structural representation of a device for selecting an accounting mode.

A device for selecting an accounting mode, and the structure of the device is shown in FIG. 9. The device includes: registering unit 91, selecting unit 92 and accounting unit 93. Registering unit 91 is adapted to store the type of accounting mode registered by a subscriber on MSS; selecting unit 92 communicates with registering unit 91 and is adapted to select an accounting mode before a session is established. Accounting unit 93 communicates with selecting unit 92 and is adapted to establish a corresponding session connection according to the accounting mode selected.

Each unit in the device of FIGS. 8 and 9 operates similarly to generally like units described above.

As can be seen from the various embodiments, when a subscriber uses the communication service of WiMAX wireless access network (the network is not limited to the WiMAX wireless access network and may also be other wireless access networks), the accounting mode may be automatically switched from the prepaid accounting mode to the postpaid accounting mode without interrupting the communication service after the balance deposited in the subscriber account is depleted. The subscriber does not need to re-register with the carrier and the continuity of the communication service used by the subscriber is guaranteed. This may avoid subscriber suffering a loss due to the interruption of the communication service after the balance of the subscriber is depleted. The subscriber satisfaction is improved and it is favourable for the carrier to save the manpower cost.

Additional advantages and modifications will readily occur to those skilled in the art. Therefore, the disclosure in its broader aspects is not limited to the specific details and various embodiments shown and described herein. Accordingly, various modifications and variations may be made without departing from the spirit or scope of the teachings as defined by the appended claims and their equivalents.

What is claimed is:

1. A method for switching an accounting mode, comprising:
    notifying, by a prepaid client of an access service network gateway, a prepaid accounting server to establish a session;
    assigning, by the prepaid accounting server, an accounting quota of the session to the prepaid client;
    notifying, by the prepaid client of the access service network gateway, the prepaid accounting server that the accounting quota of the session is depleted;
    notifying, by the prepaid accounting server, the prepaid client of the access service network gateway to stop the prepaid accounting;
    keeping the session established;
    determining, by the access service network gateway, whether a subscriber is allowed to switch to the postpaid accounting mode; and
    notifying, by an accounting client of the access service network gateway, an authentication, authorization and accounting server to start a postpaid accounting if the subscriber is allowed to switch to the postpaid accounting mode.

2. The method for switching an accounting mode according to claim 1, when a subscriber mobile station which is converted to a postpaid accounting mode needs to use a prepaid accounting mode, further comprising:
    depositing, by the subscriber, a credit in an account corresponding to the subscriber mobile station; and
    switching, by the subscriber, the accounting mode back to the prepaid accounting mode on the mobile subscriber station before a new session is established.

3. The method according to claim 1, further comprising selecting the prepaid accounting before notifying the prepaid accounting server to establish the session.

4. The method according to claim 1, further comprising:
    determining, by the prepaid accounting server, whether it is allowed to establish the session according to information of an account corresponding to a mobile subscriber station.

5. The method according to claim 4, further comprising:
    allowing, by the prepaid accounting server, to establish the session and assigning the accounting quota to the prepaid client, if a balance exists in the account corresponding to the mobile subscriber station;
    notifying, by the prepaid accounting server, the prepaid client that the session is not allowed to be established, and notifying, by the prepaid client, the mobile subscriber station to terminate the session, if no balance exists in the account corresponding to the mobile subscriber station.

6. The method according to claim 1, further comprising generating, by the authentication, authorization and accounting server, an accounting bill of a subscriber.

* * * * *